United States Patent [19]

Fukuzaki

[11] Patent Number: 5,731,801
[45] Date of Patent: Mar. 24, 1998

[54] TWO-HANDED METHOD OF DISPLAYING INFORMATION ON A COMPUTER DISPLAY

[75] Inventor: Yasuhiro Fukuzaki, Saitama-ken, Japan

[73] Assignee: Wacom Co., Ltd., Saitama-ken, Japan

[21] Appl. No.: 415,060

[22] Filed: Mar. 31, 1995

[30] Foreign Application Priority Data

Mar. 31, 1994 [JP] Japan ................................ 6-085611

[51] Int. Cl.$^6$ ........................ G09G 5/08; G09G 5/00
[52] U.S. Cl. ................. 345/146; 345/179; 364/474.27; 395/352
[58] Field of Search ........................ 345/146, 179; 395/156, 157, 352, 353; 364/474.27; G09G 5/00, 5/08

[56] References Cited

U.S. PATENT DOCUMENTS

| | | | |
|---|---|---|---|
| 4,862,389 | 8/1989 | Takagi | 364/521 |
| 5,349,139 | 9/1994 | Verrier et al. | 178/19 |
| 5,402,152 | 3/1995 | Needham | 345/179 |
| 5,436,639 | 7/1995 | Arai et al. | 345/156 |
| 5,559,946 | 9/1996 | Porter | 395/157 |

*Primary Examiner*—Andrew Faile
*Assistant Examiner*—Ngoc-yen Vu
*Attorney, Agent, or Firm*—Lowe, Price, LeBlanc & Becker

[57] ABSTRACT

A method for displaying a display object on a display screen, which method permits efficient simultaneous input operation by allowing a display object to be shown on a display screen without producing an area wherein an electronic pen is disabled when simultaneous input is performed with the electronic pen held in a dominant hand and an electronic cursor held in the other hand. The electronic pen is operated by the operator's dominant hand and the electronic cursor by the other hand on an input table of a coordinate input device. A pointer indicating the position specified by the electronic pen, a pointer indicating the position specified by the electronic cursor, and display objects associated with the electronic cursor are displayed on the display screen. The display objects on the display screen are shown at the location of the other hand, i.e., the non-dominant hand, so that the electronic cursor does not interfere with the movement of the electronic pen when the operator moves the electronic pen to work on the display objects on the input table.

14 Claims, 6 Drawing Sheets

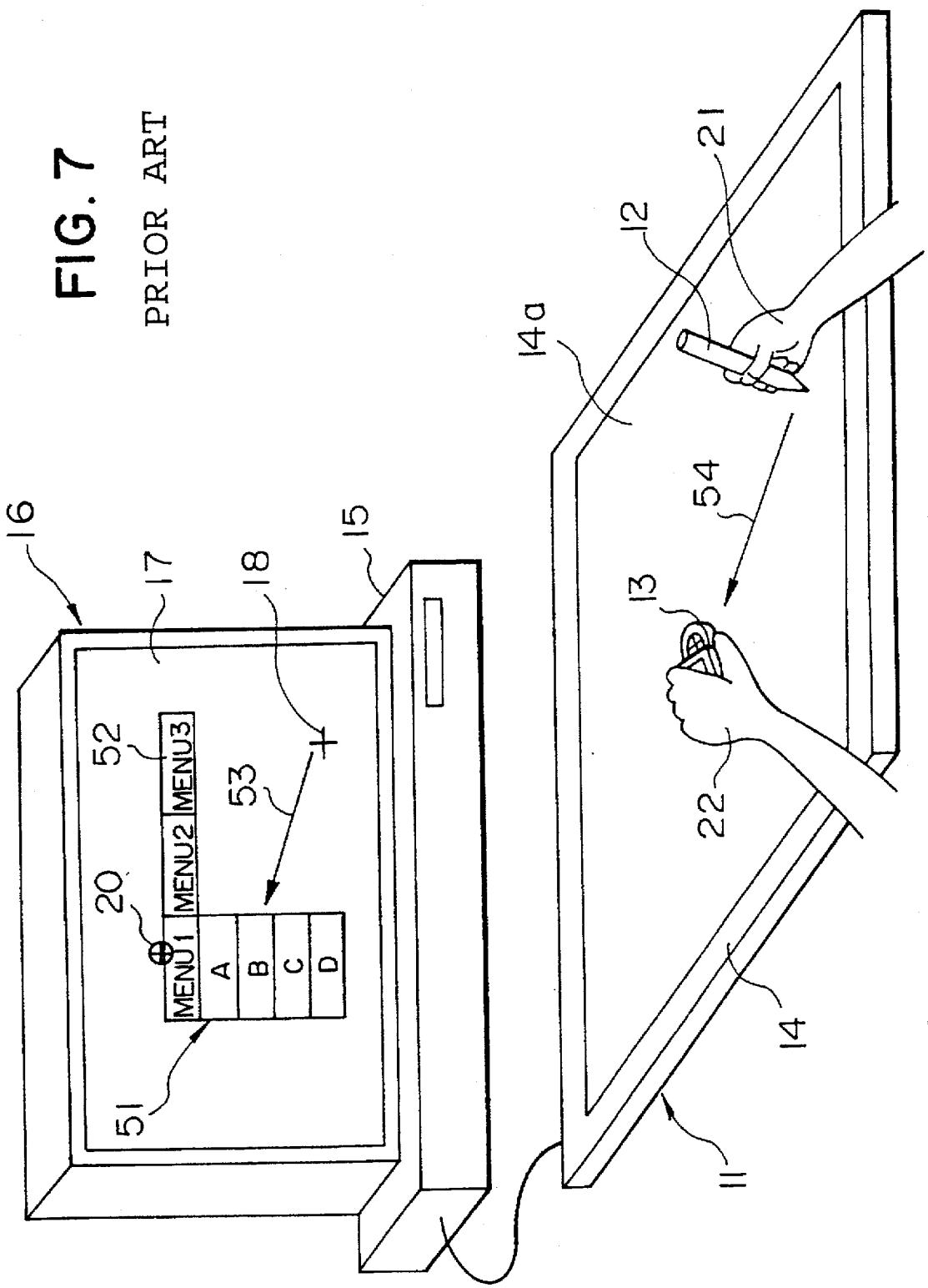

TWO-HANDED METHOD OF DISPLAYING INFORMATION ON A COMPUTER DISPLAY

BACKGROUND OF THE INVENTION

1. Field of the Invention:

The present invention relates to a method for displaying a display object, which permits efficient and smooth operation of two position pointing devices held in both hands and operated simultaneously when displaying a window or menu on a display screen in a coordinate input device equipped with a multi-device function which enables simultaneous input through a plurality of position pointing devices.

2. Description of the Related Art

Such input devices as keyboards and mouses have been proposed as the input devices which enable easy and efficient input operation on personal computers, workstations, etc. Today, a pen-type position pointing device (hereinafter referred to as an "electronic pen") is attracting attention because of its ease of operation and familiarity. The electronic pen is used in combination with a coordinate detecting device having an input table to constitute a coordinate input device.

The use of the electronic pen alone as an input means, however, poses the problems described below.

The progress in graphical user interfaces has led to popularity of menu-based input operation; pull-down menus which are pulled down from menu bars located at the top of display screens or windows are dominant these days. When the electronic pen is used with such a pull-down menu, an operator has to frequently move the electronic pen from a writing area to the menu bar located at the top of the screen, causing a great deal of inconvenience to the operator.

There is also a pop-up menu which is usually hidden from the screen but brought up and displayed on the screen in the current working position only when it is required. This type of menu requires less travel of the electronic pen for accessing the menu; however, it is disadvantageous in that the object currently being processed is hidden behind the menu.

The inconvenience and concealment problem described above are caused because the electronic pen is the only input device. As one solution to the problem, a method has been proposed wherein an operator holds the electronic pen in his dominant hand and simultaneously operates a cursor type position pointing device hereinafter referred to as an "electronic cursor") with his other hand. For instance, the inconvenience mentioned above can be alleviated by using the electronic cursor to display the pull-down menu while using the electronic pen to select a menu item. In the case of the pop-up menu, if an arrangement is made to enable the menu to be moved to a required position by the electronic cursor, then the electronic pen can be operated without concealing the current object being worked on, thus solving the problem of concealment and improving the ease of operation.

A hardware device configuration which enables simultaneous input through a plurality of position pointing devices including an electronic pen and an electronic cursor has been proposed by the applicant in Japanese Patent Laid-Open No. 3-147012, Japanese Patent Application No. 63-106033, Japanese Patent Application No. 63-108424, Japanese Patent Application No. 63-108426, etc. A device having the configuration is referred to as a coordinate input device equipped with a multi-device function.

The coordinate input device for carrying out simultaneous input by operating both the electronic pen and the electronic cursor at the same time, however, suffers from the following inconvenience. When the coordinate input device is combined with the pull-down menu on the display screen, the area the electronic pen can be moved on the input table of the coordinate detecting device is restricted by the presence of the electronic cursor. The electronic pen cannot be operated in some areas because of a conflict between the way the electronic pen and the electronic cursor move on the input table of the coordinate detecting device, the position where the pull-down menu is displayed on the display screen, and the way the pointers of the electronic pen and electronic cursor move.

An example of such inconvenience is described with reference to FIG. 7. A pull-down menu 51 including menu bar 52, is displayed on a display screen 17 of a display unit 16. An electronic cursor 13 held in a left hand 22 of an operator is associated with the pull-down menu 51. The pull-down menu 51 can be moved, for example, on a display screen 17 by setting a pointer 20 at "MENU 1" of the menu bar 52. Under this condition, if an electronic pen 12 held in a right hand (supposed to be the dominant hand) 21 of the operator is moved on an input table 14a of a coordinate detecting device 14 and a pointer 18 of the electronic pen 12 is moved into the pull-down menu 51 on the display screen 17 (arrow 53) to select, for example, item B in an attempt to perform a particular operation, then the electronic pen 12 conflicts with the electronic cursor 13 as indicated by an arrow 54 on the input table 14a, preventing the pointer 18 from moving to an intended point on the display screen 17. Thus, according to the conventional display method implemented on the display screen 17, the case body of the electronic cursor 13 undesirably leads to the formation of an area wherein the electronic pen 12 cannot be operated on the input table 14a. Numeral 15 denotes a computer which reads and executes an application program.

SUMMARY OF THE INVENTION

Accordingly, an object of the present invention is to provide a method of displaying a display object, such as a menu, which method allows the display object to be shown on a display screen without causing any operation-prohibited area to be formed, thus permitting efficient input operation in a coordinate input device equipped with a multi-device function which enables an operator to hold position pointing devices in both hands to carry out simultaneous input through the two position pointing devices.

In the method of displaying a display object on a display screen in accordance with the present invention, the electronic pen is operated by the operator's dominant hand on the input table of the coordinate detecting device and the electronic cursor is operated by the other hand. The pointer indicating the position specified by the electronic pen, the pointer indicating the position specified by the electronic cursor, and a display object associated with the electronic cursor are displayed on the display screen. The display object on the display screen is shown in a location where the other hand is located so that the electronic cursor does not interfere with the electronic pen which is moved on the input table to carry out pointing operation on the display object.

In the aforesaid method, the display object associated with the electronic cursor is a push-up menu with the menu bar thereof located at the bottom of a display screen, the menu items extending upward from the menu bar. In the aforesaid method, the display object associated with the electronic cursor is a window with a title bar, i.e., a handle, displayed at the bottom thereof.

According to the present invention, in the coordinate input device equipped with the multi-device function which enables an operator to hold the electronic pen in his dominant hand and the electronic cursor in the other hand to accomplish simultaneous input through the two position pointing devices, the mode for displaying the display object associated with the electronic cursor and the display position thereof are properly set on the display screen so that the electronic cursor does not restrict the movement of the electronic pen on the input table when the electronic pen is operated to work on the display object associated with the electronic cursor.

BRIEF DESCRIPTION OF THE DRAWINGS

FIG. 7 is a diagram of the configuration of a computer system equipped with the coordinate input device having the multi-device function, and is used to explain the problems solved by the present invention.

DESCRIPTION OF THE PREFERRED EMBODIMENTS

Figure 1:
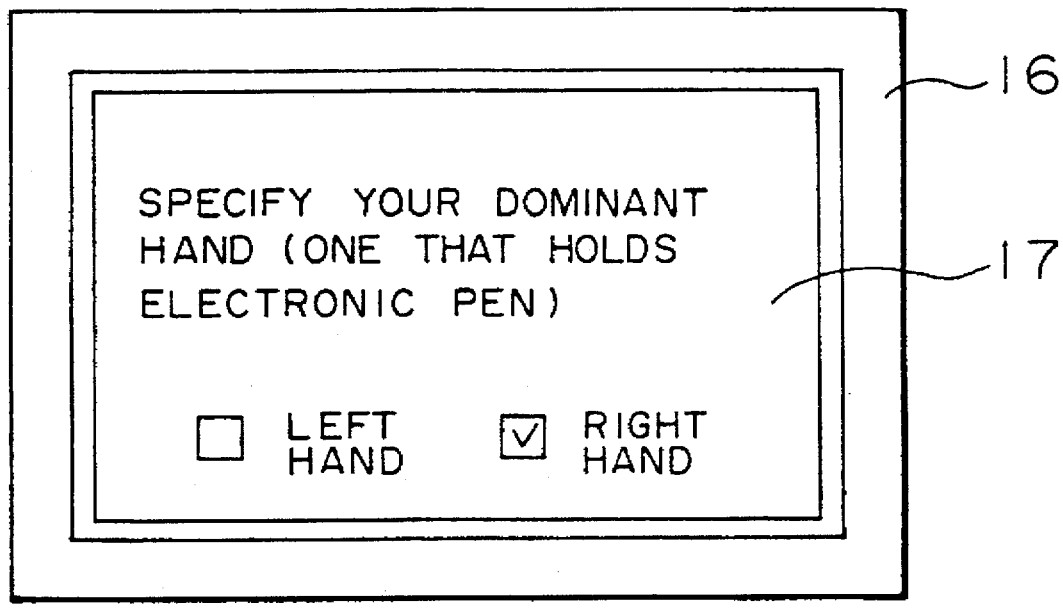
FIG. 1 is a diagram of an initial display on a display screen.

The embodiment of the present invention will now be described with conjunction with the attached drawings.

The method for displaying a display object on a display screen in accordance with the present invention applies to a coordinate input device equipped with a multi-device function. The characteristic configuration and operation of the coordinate input device equipped with the multi-device function and a system provided with this coordinate input device are described by, referring to FIG. 7.

A coordinate input device 11 having the multi-device function is provided with, for example, two position pointing devices 12, 13. Device 11 is capable of simultaneously detecting the position information specified by the two respective position pointing devices and outputting coordinate data thereof. The coordinate input device 11 is equipped with the coordinate detecting device or tablet 14 designed to simultaneously detect the position information specified both of position pointing devices 12, 13. Coordinate detecting device 14 incorporates a sensor unit including input table 14a. The coordinate data output from the coordinate input device 11 is supplied to an external host computer 15. In the computer 15, the coordinate data received from the coordinate input device 11 is supplied to a device driver (not shown) which is provided for the coordinate input device 11. The computer 15 includes a memory for storing an application program for implementing a predetermined job or processing by using the received coordinate data, a CPU for reading and executing the application program, and other devices.

The two position pointing devices 12, 13 are operated by and held in both hands of an operator. The position pointing device 12 is a pen-type position pointing device (electronic pen) which is operated by the operator's dominant hand, while the position pointing device 13 is a cursor-type position pointing device (electronic cursor) which is operated by the other hand of the operator.

The coordinate input device 11 is an input means of the computer 15 to enter the positional information (coordinate information). The computer 15 further incorporates the display unit 16, such as a CRT or LCD, as a component of the system. The computer 15 performs required display on the display screen 17 of the display unit 16 by executing the application program stored in the memory and by performing the processing in accordance with the positional information received from the coordinate input device. The display contents, i.e., display objects on the display screen 17 are decided by the application program.

The method for displaying a display object on the screen is concerned with how the display object is displayed and laid out on the display screen 17; the method is characterized by the display mode and display position of the display object, which is associated with the electronic cursor 13 operated by the non-dominant hand, on the display screen 17. More specifically, the display method is characterized by the display mode and display position associated with the electronic cursor which are set to prevent the electronic cursor from interfering with the operation and movement of the electronic pen when the electronic pen is operated to bring the pointer of the electronic pen close to the display object associated with the electronic cursor on the display screen under a condition wherein the pointer located in the position specified by the electronic pen 12 held in the dominant hand, the pointer located in the position specified by the electronic cursor 13 held in the other hand, and a display object such as a menu or a window associated with the electronic cursor 13 are displayed on the display screen 17 of the display unit 16. In the following embodiment, the display mode and display position of the display object associated with the electronic cursor are described.

In the case of the coordinate input device 11 to which the display method according to the present invention is applied, it is assumed that, of the two position pointing devices (the electronic pen 12 and the electronic cursor 13), the electronic pen 12 is operated by the operator's dominant hand, while the electronic cursor 13 is operated by the other hand. Hence, at the beginning of the operation of the coordinate input device 11 provided with the multi-device function, the system requires the operator to specify his dominant hand. Then, the display screen is set for the specified dominant hand. FIG. 1 includes an example of the initial display screen for specifying the dominant hand.

Figure 2A:
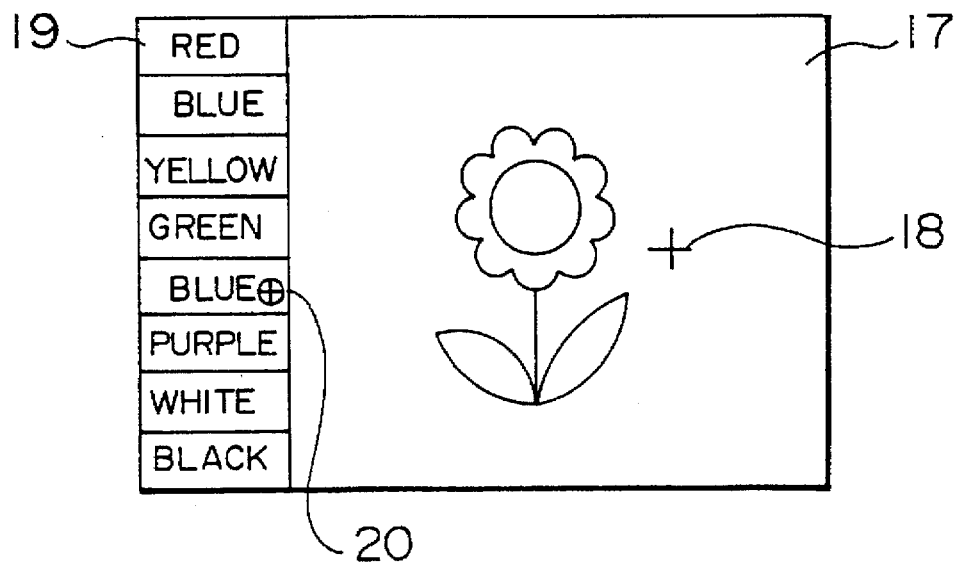
FIGS. 2A and 2B are diagrams of examples of the display screen for a right-handed operator and a left-handed operator, respectively.
Figure 2B:
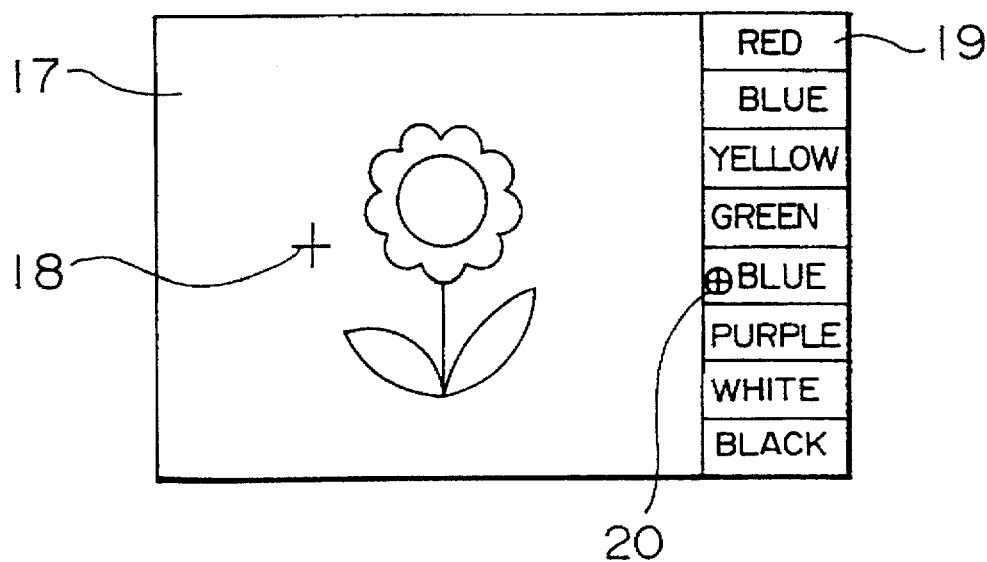

In FIG. 1, the system asks the operator if he is left-handed or right-handed on the display screen; the operator selects and specifies his dominant hand on the screen 17. When the operator specifies "RIGHT HAND," which means that he operates the electronic pen 12 by the right hand, the screen 17 is set for the right-handed, as shown in FIG. 2A. Likewise, when the operator specifies "LEFT HAND," which means that he operates the electronic pen 12 by his left hand, the screen 17 is set for the left-handed operator, as shown in FIG. 2B. As it is obvious from FIG. 2, the system assumes that the electronic pen 12 is operated by the dominant hand, while the electronic cursor 13 is operated by the other hand; therefore, the display object shown on the display screen 17 is arranged so that the pointer 18 related to the position specified by the electronic pen is disposed on the dominant hand's side, while the pointer 20 for the position specified by the electronic cursor 13 and the display object such as a menu 19 associated with the electronic cursor 13 are disposed on the other hand's side. Thus, it is possible to prevent the electronic cursor from interfering with the operation and movement of the electronic pen when the electronic pen 12 and the electronic cursor 13 are operated on the input table 14a of the coordinate detecting device 14, by changing the layout of the display object associated with the electronic cursor 13 on the display screen 17 in accordance with the dominant hand operating the electronic pen 12.

In the following description of the display contents, it is assumed that the operator is right-handed. Hence, in FIG. 7, numeral 21 denotes the right hand which is the dominant hand, and numeral 22 denotes the left hand which is the other hand.

Figure 3:
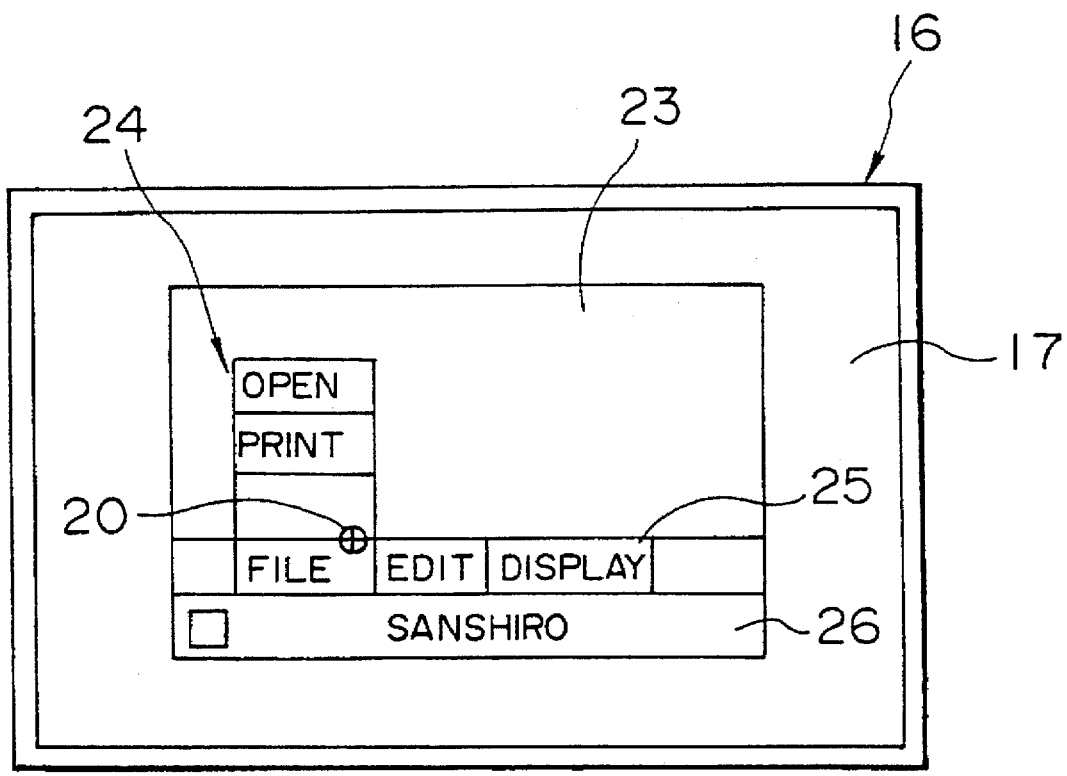
FIG. 3 is a diagram of a first example of a display object.

After completing the setting for the specified dominant hand, the CPU of the computer 15 reads a desired application program from the memory and executes it. This causes the display screen 17 to display the contents for the application program. Any desired display contents are available; an example of the display contents is shown in FIG. 3. According to the arrangement shown in FIG. 3, a window 23 is displayed in the display screen 17 and a push-up menu 24 is displayed in the window 23.

The push-up menu will be explained in more detail. As explained with conjunction with FIG. 7, in the past, pull-down menus were popular. In such a pull-down menu, when one of the menu titles laid out at the top of a display screen or window is selected and specified by a pointer (by moving the pointer until it reaches the desired menu title and pressing the button of a mouse or the like), the menu items under the selected menu title are pulled down and displayed. When the operator tries, however, to handle the pull-down menu with the two pointers for the two position pointing devices which have the multi-device functions and which are held in operator's both hands, the position pointing devices in both hands conflict with each other as previously described. This is attributable to the following reason: the electronic cursor usually has its case body at the bottom and therefore, if the menu items are displayed downward from a pointed position above the electronic cursor, then the electronic pen bumps against the case body of the electronic cursor when it tries to move to the place where the menu items are displayed. The problem of the conflict between the electronic cursor and the electronic pen can be solved by displaying the menu items from bottom to top rather than from top to bottom. The menu which has this new display mode will be referred to as "push-up menu" in this embodiment.

A push-up menu 24 (FIG. 3) mentioned above is a menu for carrying out editing or the like of a document file titled "SANSHIRO" as an example. The pointer 20 for the electronic cursor 13 assumed to be at the location of the item "FILE", and it is associated with the push up menu 24; the electronic cursor 13 is associated with the menu 24 by taking out or moving the menu 24. By taking the display object associated with the electronic cursor 13 as the push-up menu and setting the position of the pointer 20 for the electronic cursor 13 related to this menu at the bottom on the display screen 17, the case body of the electronic cursor 13 can be located at the bottom on the input table 14a, thus making it possible to prevent collision with the electronic pen 12 and prevent the electronic cursor 13 from interfering with the electronic pen 12 which moves in accordance with the menu 24. Numeral 25 denotes the menu bar and numeral 26 the title bar.

Figure 4:
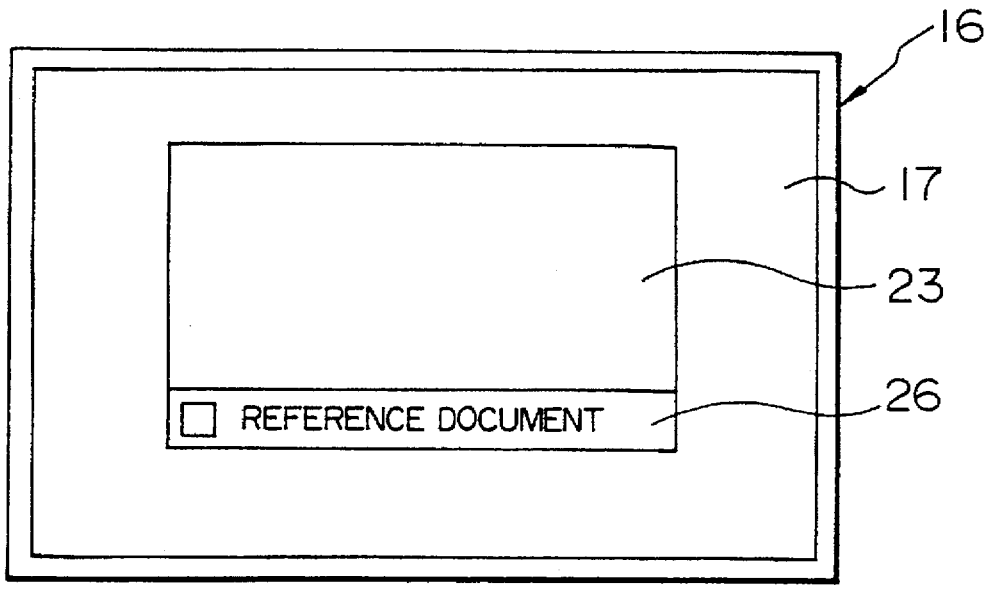
FIG. 4 is a diagram of a second example of a display object.

Another example of display object on the display screen is described with reference to FIG. 4. In FIG. 4 shows the window 23 is the display object associated with the operation of the electronic cursor 13. Window 23 of FIG. 4 is substantially identical to window 23 of FIG. 3. At the bottom of the window 23 in the display screen 17 of each of FIG. 3 and 4 is title bar 26 (titled "REFERENCE DOCUMENT" in FIG. 4).

The window 23 can be moved around on the display screen 17 by grabbing the title bar 26 with the pointer 20 controlled by electronic cursor 13. In the conventional system w herein the title bar of the window 23 is located at the top of the window, when the window 23 is moved by the electronic cursor 13 or when writing something in the window with the electronic pen 12, or performing other similar operations, the case body of the electronic cursor tends to interfere with movement of the electronic pen on the input table 14a.

With the title bar 26 located at the bottom of the window 23, in contrast to the above described conventional system, when the window 23 is moved by the electronic cursor 13, the pointer 20 of the electronic cursor 13 grabs the title bar 26 located at the bottom in the display screen 17 and therefore the case body of the electronic cursor 13 is located at the bottom on the input table 14a. Hence, the electronic pen 12 which moves inside the window 23 is hardly interfered with, leading to improved operability of the electronic pen 12.

Figure 5:
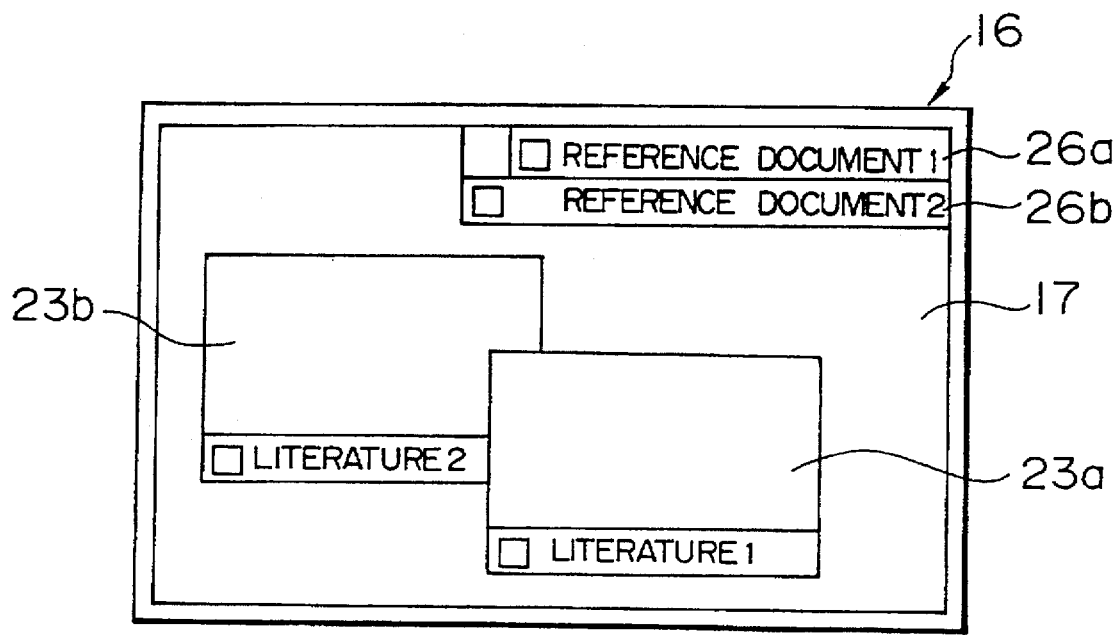
FIG. 5 is a diagram of other effects related to the second display object.

Locating the title bar 26 at the bottom of the window 23 produces another desirable effect; as shown in FIG. 5, even when the window 23 is moved out of the screen from the top edge of the display screen 17, only the title bars 26a, 26b can be left inside the display screen 17. This enables the operator to see the title of the window located mostly outside the screen. Hence, for a window which is unnecessary for the current process, the title bar alone of the window is left in the display screen and only the necessary windows 23a, 23b are displayed on the display screen, thereby enabling efficient display of the display object on the screen 17.

Figure 6:
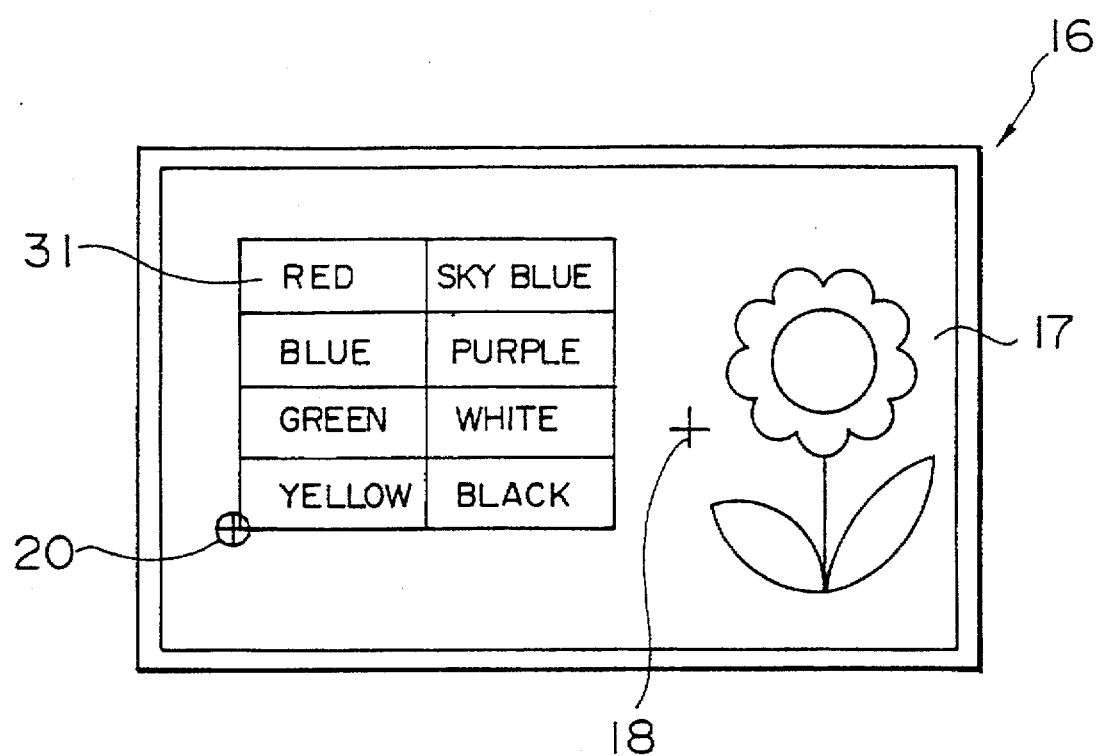
FIG. 6 is a third example of display object.

In the exemplary display of FIG. 6 another example of the display object, pop-up menu associated with the electronic cursor 13. The application program shown on the display screen 17 of FIG. 6 is, for example, designed for the operation of coloring a flower pattern 32 shown in the screen 17. The areas in the pattern 32 to be colored are specified by the electronic pen 12 and various colors displayed as the selective items in the pop-up menu 31 are selected by the electronic pen 12 (the selection is accomplished by specifying with the pointer 18). In the operation, the major role of the electronic cursor 13 which is operated as an auxiliary device is to move the pop-up menu 31 on the screen as necessary. In this embodiment, the pointer 20 is disposed at the bottom left corner of the pop-up menu 31 so that the electronic cursor 13 can grab the pop-up menu 31 and move it to a desired position.

As it is obvious from the above description, according to the present invention, in the coordinate input device equipped with the multi-device function, an operator operates the electronic pen with his dominant hand and the electronic cursor with the other hand; and the display mode and display position of a display object on the screen which is associated with the electronic cursor are set so that the electronic cursor does not interfere with the movement of the electronic pen on the input table. As a result, no area wherein the electronic pen is disabled is formed when the operator carries out simultaneous input with the electronic pen held in the dominant hand and the electronic cursor held in the other hand, thus permitting efficient input operation.

What is claimed is:

1. A method of displaying a display object on a display screen, wherein an electronic pen is operated by an operator's dominant hand and an electronic cursor is operated by the other hand, the pen and cursor both being operated on a coordinate detecting device input table; the method comprising:

displaying on the display screen (a) a first pointer which indicates a position pointed by said electronic pen, (b) a second pointer which indicates a position pointed by said electronic cursor, and (c) a display object associated with said electronic cursor;

said display object being displayed on said display screen at the location of said other hand so that said electronic cursor does not interfere with said electronic pen when said electronic pen is moved on said input table to work on said display object.

2. A method of displaying a display object on a display screen according to claim 1, wherein said display object associated with said electronic cursor is a push-up menu which has a menu bar located at its bottom and a menu item extending upward from said menu bar when the menu item is displayed.

3. A method of displaying a display object on a display screen according to claim 1, wherein said display object associated with said electronic cursor is a window which has a title bar serving as a handle displayed at the bottom of said window.

4. A method of operating a display of a computer by an operator using a dominant hand and another hand, the computer activating the display so plural objects are simultaneously displayed on a display area of the display, the method comprising:

selecting one of the objects by the operator pointing a first position device at a first point on an input table while pointing a second position pointing device to a second point on the input table; the operator pointing the first device with the another hand and pointing the second device with the dominant hand;

activating the first and second position pointing devices, the input table, the computer and the display so signals indicative of the positions of the first and second devices relative to the table are supplied to the computer, the computer responding to the signals to activate the display with simultaneous indications of the positions of the first and second devices; the first position pointing device including a bulbous body grasped by fingers and the palm of the another hand, the second position pointing device including a rod like body grasped by a finger and thumb of the dominant hand as a pen is grasped, the objects being positioned on the display so the position of the bulbous body does not interfere with the position of the rod like body, the body objects selected by the first position pointing device being located together in one region, locating the region on the display only at positions remote from positions on the display corresponding to positions on the table where the second position pointing device is to be located so the bulbous body and the another hand grasping it do not interfere with movement of the dominant hand and the rod like body on the table.

5. A method of operating a display of a computer, the computer activating the display so a window is provided in a display area of the display, comprising activating the computer to cause a vertically extending menu bar to be poisitioned adjacent a side of the window opposite from a dominant hand of an operator, selecting a menu title from the menu bar by the operator positioning a first position pointing device to a first point on an input table with another hand opposite from the dominant hand while selecting a region in the area by the operator positioning a second position pointing device to a second point on the input table with the dominant hand, the first position pointing device including a bulbous body grasped by fingers and the palm of the another hand, the second position pointing device including a rod like body grasped by a finger and thumb of the dominant hand as a pen is grasped, the first and second devices and the input table and the display and the computer being coupled together so the positions of the first and second devices relative to the input table are signalled to the computer which activates the display, the menu bar being sufficiently close to said side of the display as to avoid interference with movement of the rod like body by the dominant hand on the table during selection of the menu title from the menu bar.

6. A method of operating a display of a computer comprising activating the computer so a window is provided in a display area of the display, the window being provided so it includes a bottom title bar and a menu bar containing plural menu titles, the menu bar being located immediately above the bottom title bar, selecting one of the menu titles, and activating the computer so that in response to the one menu title being selected plural menu items are pushed up above the selected menu title.

7. A method of operating a computer display including a first window in a display area, the first window having a first title bar along its bottom edge, the method comprising: moving the first window to the top of the display area so the only substantial part of the first window in the display area is the first title bar, so title indicia in the first title bar are displayed in the display area.

8. the method of claim 7 further including moving a second window having a second title bar along its bottom edge to the top of the display area so the second window overlaps and is behind the first window and the second title bar is immediately below the first title bar so (a) title indicia in the second title bar are displayed in the display area below the indicia in the first title bar and (b) the indicia in the first and second title bars are simultaneously displayed.

9. The method of claim 7 wherein the first window includes a menu bar above the title bar, and pushing up items from the menu bar while the first window is positioned in the display area at a location such that indicia in the pushed up items are displayed.

10. A method of operating a display of a computer, comprising activating the computer to cause a window to be provided in a display area of the display and an object to be provided in the display area, the window including a menu containing plural menu items selectively associated with different regions of the object, the method comprising:

selecting one of the menu items by an operator positioning a first position pointing device to a first point on a control surface with a first hand while selecting one of the regions of the object by the operator positioning a second position device to a second point on the control surface with a second hand, and activating the computer so it performs an operation specified by the selected menu item in the selected region.

11. The method of claim 10 further including moving the window about in the display area by the operator grabbing the window with the first position pointing device and moving the first position pointing device on the control surface with the first hand.

12. The method of claim 10 wherein the menu items are colors and the object regions are regions to be colored, whereby the computer is activated to cause the color selected by the operator positioning the first position pointing device to be displayed in the region selected by the operator positioning the second position pointing device.

13. The method of claim 10 wherein the second hand is a dominant hand of the operator and the first hand is another hand of the operator, the first and second position pointing devices pointing to an input table that exchanges energy with the first and second position pointing devices so signals indicative of the positions of the first and second devices relative to the tablet are supplied to the computer, the computer responding to the signals to activate the display with simultaneous indications of the positions of the first and second devices; the first position pointing device including a bulbous body grasped by fingers and the palm of the another hand, the second position pointing device including a rod like body grasped by a finger and thumb of the dominant hand as a pen is grasped, the menu items being positioned on the display so the position of the bulbous body does not interfere with the position of the rod like body.

14. The method of claim 13 wherein the menu items are located together in one region, further including moving the region to different positions on the display area by the another hand positioning the first position pointing device at a point on the table corresponding with a corner of the region opposite from the dominant hand and then moving the first position pointing device on the table to move the region on the display area.

* * * * *